(12) United States Patent
Ryon et al.

(10) Patent No.: US 11,253,823 B2
(45) Date of Patent: Feb. 22, 2022

(54) MIXING NOZZLES

(71) Applicant: Delavan Inc., West Des Moines, IA (US)

(72) Inventors: Jason Ryon, Carlisle, IA (US); Philip E. O. Buelow, West Des Moines, IA (US); Lev Alexander Prociw, Johnston, IA (US); Brandon Phillip Williams, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 266 days.

(21) Appl. No.: 16/370,731

(22) Filed: Mar. 29, 2019

(65) Prior Publication Data

US 2020/0306703 A1    Oct. 1, 2020

(51) Int. Cl.
*B01F 5/04* (2006.01)
*B01F 3/04* (2006.01)
*B64D 37/32* (2006.01)

(52) U.S. Cl.
CPC .......... *B01F 5/0486* (2013.01); *B01F 3/0446* (2013.01); *B64D 37/32* (2013.01); *B01F 2003/04872* (2013.01); *B01F 2215/0086* (2013.01)

(58) Field of Classification Search
CPC .................. B01F 3/0446; B01F 5/0486; B01F 2003/04872; B01F 2215/0086; B64D 37/32
USPC .............................. 261/76; 244/129.2, 135 R
See application file for complete search history.

(56) References Cited

U.S. PATENT DOCUMENTS

| | | | | |
|---|---|---|---|---|
| 4,139,157 A | * | 2/1979 | Simmons | F23D 11/107 239/400 |
| 5,737,921 A | * | 4/1998 | Jones | F23M 5/085 60/740 |
| 6,389,815 B1 | * | 5/2002 | Hura | F23R 3/346 60/746 |
| 8,327,643 B2 | | 12/2012 | Yamamoto et al. | |

(Continued)

FOREIGN PATENT DOCUMENTS

| | | |
|---|---|---|
| EP | 2093489 A2 | 8/2009 |
| GB | 1395691 A | 5/1975 |

OTHER PUBLICATIONS

Extended European Search Report dated Jul. 6, 2020, issued during the prosecution of European Patent Application No. 19212589.6.

*Primary Examiner* — Charles S Bushey
(74) *Attorney, Agent, or Firm* — Locke Lord LLP; Scott D. Wofsy; Alicia J. Carroll

(57) ABSTRACT

A nozzle includes an outer gas flow path, an inner gas flow path radially inward from the outer gas flow path, a liquid flow path defined radially between the inner gas flow path and the outer air flow path, and a core conduit defined radially inward from the inner gas flow path. An injector assembly includes an outer housing, a nozzle within the outer housing, and an outer housing gas flow path defined radially outward from the nozzle between an inner surface of the outer housing and an outer surface of the nozzle. The nozzle includes an outer gas flow path, an inner gas flow path radially inward from the outer gas flow path, a liquid flow path defined radially between the inner gas flow path and the outer gas flow path and a core conduit defined radially inward from the inner gas flow path.

18 Claims, 5 Drawing Sheets

(56) References Cited

U.S. PATENT DOCUMENTS

| | | | |
|---|---|---|---|
| 8,726,668 B2 | 5/2014 | Patel et al. | |
| 8,925,325 B2 | 1/2015 | Overman et al. | |
| 10,054,093 B2* | 8/2018 | Spivey | F23R 3/36 |
| 10,132,499 B2* | 11/2018 | Matsuyama | F23R 3/34 |
| 10,808,935 B2* | 10/2020 | Staufer | F23R 3/28 |
| 2013/0327849 A1* | 12/2013 | Matsuyama | F23R 3/286 |
| | | | 239/406 |
| 2016/0265778 A1* | 9/2016 | Patel | F23R 3/28 |
| 2016/0363321 A1* | 12/2016 | Benjamin | F23R 3/343 |
| 2020/0309376 A1* | 10/2020 | Prociw | F23K 5/08 |

* cited by examiner

MIXING NOZZLES

BACKGROUND

1. Technological Field

The present disclosure relates to injector assemblies, and more particularly to mixing nozzles in injector assemblies.

2. Description of Related Art

Generally, fuel tank inerting systems reduce the quantity of oxygen in an ullage of an aircraft fuel tank in order to reduce its reactivity with any fuel vapor.

The conventional techniques have been considered satisfactory for their intended purpose. However, there is an ever present need for improved inerting systems. This disclosure may address at least one of these needs.

SUMMARY

A nozzle includes an outer gas flow path and an inner gas flow path radially inward from the outer gas flow path. The outer gas flow path has a metering flow lip at an outlet thereof. The nozzle includes a liquid flow path defined radially between the inner gas flow path and the outer air flow path. The nozzle includes a core conduit defined radially inward from the inner gas flow path.

In certain embodiments, the outer gas flow path is defined between an outer nozzle shell and at least one of an outer heat shield or an outer diameter liquid distributor. The outer nozzle shell can be radially outward from the outer heat shield. The metering flow lip can be defined by a radially inward extending flange of the outer nozzle shell. An annular opening defined between the metering flow lip and an outer diameter surface of the outer diameter liquid distributor can be smaller than an upstream annular opening defined between an inner diameter surface of the outer nozzle shell and the outer diameter surface of the outer diameter liquid distributor. An outer housing gas flow path can be defined radially outward from the outer nozzle shell. An annular opening defined between the metering flow lip and an outer diameter surface of the outer diameter liquid distributor can be smaller than an upstream annular opening defined between an inner diameter surface of the outer nozzle shell and an outer diameter surface of the outer heat shield.

The core conduit can be defined within a core nozzle shell. The outer gas flow path can be defined between an outer nozzle shell and at least one of an outer heat shield or an outer diameter liquid distributor. The outer nozzle shell and the core nozzle shell can terminate at respective downstream ends at the same axial position relative to a longitudinal nozzle axis.

In certain embodiments, the core conduit is coaxial with the outer gas flow path and the inner gas flow path. The core conduit can be in fluid communication with a first gas source. The inner gas flow path and the outer air flow path can be in fluid communication with a second gas source different from the first gas source. The liquid flow path can be defined between an inner diameter liquid distributor and an outer diameter liquid distributor. The inner gas flow path can be defined between an inner heat shield and a core nozzle shell. A mixing zone can be defined downstream from an outlet of the nozzle has an air-to-liquid ratio of 400 to 1. At least one of the inner heat shield or a core nozzle shell can include swirl vanes extending therefrom. The outer gas flow path can be a converging non-swirling gas flow path. The inner gas flow path can be a diverging swirling gas flow path. At least one of the inner diameter liquid distributor or the outer diameter liquid distributor can include helical threads. Helical threads can be defined on a cylindrical surface of at least one of the inner diameter liquid distributor or the outer diameter liquid distributor.

In accordance with another aspect, an injector assembly includes an outer housing and a nozzle positioned within the outer housing. The nozzle includes an outer gas flow path having a metering flow lip at an outlet thereof, an inner gas flow path radially inward from the outer gas flow path, a liquid flow path defined radially between the inner gas flow path and the outer gas flow path and a core conduit defined radially inward from the inner gas flow path. The injector assembly includes an outer housing gas flow path defined radially outward from the nozzle between an inner surface of the outer housing and an outer surface of the nozzle.

the outer gas flow path defined between an outer nozzle shell and at least one of an outer heat shield or an outer diameter liquid distributor.

In certain embodiments, the metering flow lip is defined by a radially inward extending flange of the outer nozzle shell. An annular opening defined between the metering flow lip and an outer diameter surface of the outer diameter liquid distributor can be smaller than an upstream annular opening defined between an inner diameter surface of the outer nozzle shell and the outer diameter surface of the outer diameter liquid distributor. The annular opening defined between the metering flow lip and an outer diameter surface of the outer diameter liquid distributor can be smaller than an upstream annular opening defined between the inner diameter surface of the outer nozzle shell and an outer diameter surface of the outer heat shield. The core conduit can be defined within a core nozzle shell. The outer gas flow path can be defined between an outer nozzle shell and at least one of an outer heat shield or an outer diameter liquid distributor. The outer nozzle shell and the core nozzle shell can terminate at respective downstream ends at the same axial position relative to a longitudinal nozzle axis.

In certain embodiments, the injector assembly includes a gas manifold in fluid communication with at least one of the inner gas flow path or the outer gas flow path of the nozzle. The injector assembly can include at least one strut operatively connecting the nozzle to the outer housing. The core conduit can be coaxial with the outer gas flow path, the inner gas flow path and the outer housing gas flow path. The core conduit and the outer housing gas flow path can be in fluid communication with a first gas source. The inner gas flow path and the outer gas flow path can be in fluid communication with a second gas source different from the first air source. A mixing zone can be defined downstream from an outlet of the nozzle has an air-to-liquid ratio of 400 to 1. A pressure drop across at least one of the core conduit or the outer housing gas flow path from a first position upstream from the nozzle to a second position downstream from the nozzle can be 3 inches of water pressure or less.

In accordance with another aspect, an inerting system includes a duct, an injector assembly positioned within the duct. The injector assembly includes a nozzle. The nozzle includes an outer gas flow path having a metering flow lip at an outlet thereof, an inner gas flow path radially inward from the outer gas flow path, and a liquid flow path defined radially between the inner gas flow path and the outer gas flow path, a core conduit defined radially inward from the inner gas flow path. The inerting system includes a catalytic reactor positioned within the duct downstream from the injector assembly and at least one tank downstream from the catalytic reactor.

In certain embodiments, a pressure drop in the duct from a first position upstream from the nozzle to a second position downstream from the nozzle is three inches of water pressure or less. The duct can include an upstream portion and a downstream portion. The injector assembly can include an outer housing with a first portion and a second portion. The first portion of the outer housing can be connected to the upstream portion of the duct and the second portion of the outer housing can be connected to the downstream portion of the duct.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
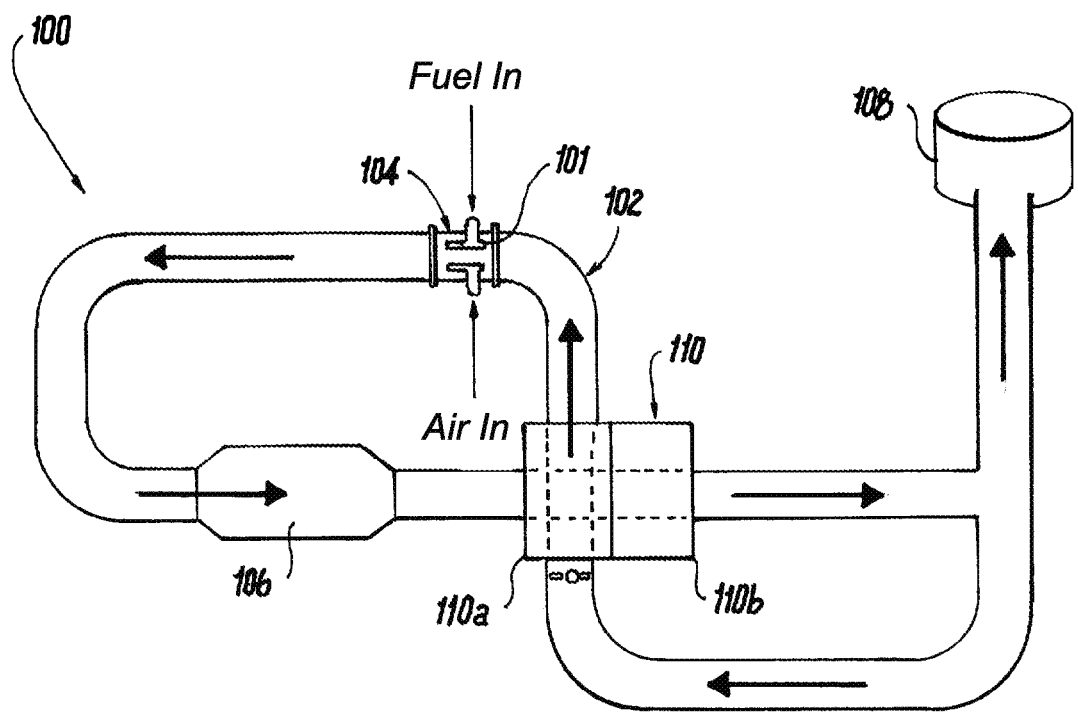
FIG. 1 is a schematic depiction of a fuel inerting system constructed in accordance with embodiments of the present disclosure, schematically showing an injector assembly.
Figure 2A:
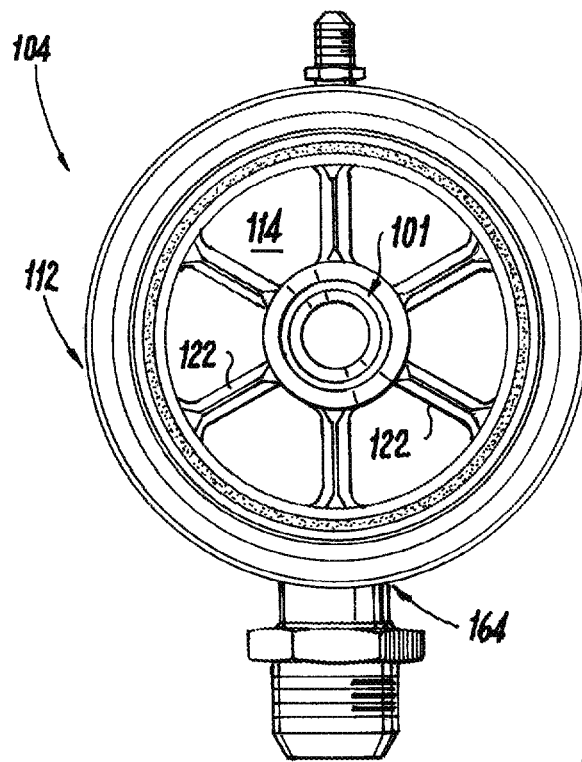
FIG. 2A is a downstream view of an injector assembly constructed in accordance with embodiments of the present disclosure, showing a nozzle within an outer housing.
Figure 2B:
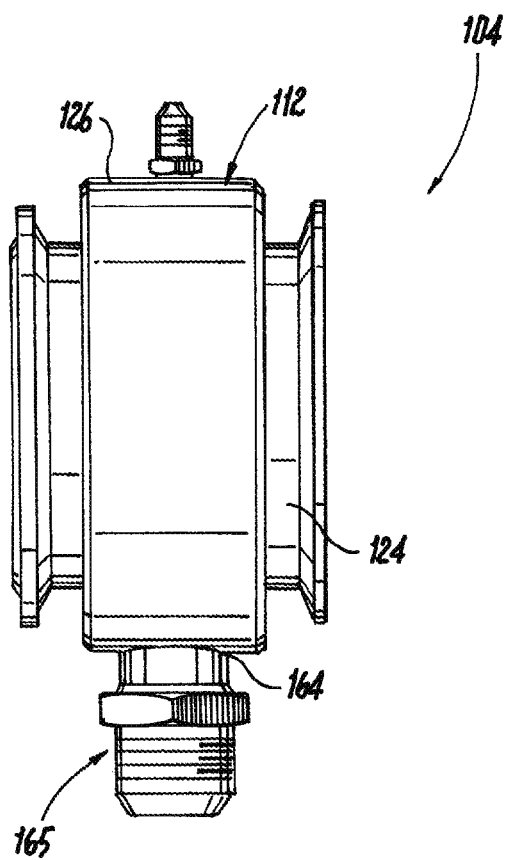
FIG. 2B is a side view of the injector assembly of FIG. 2A, showing first and second portions of the outer housing.
Figure 2C:
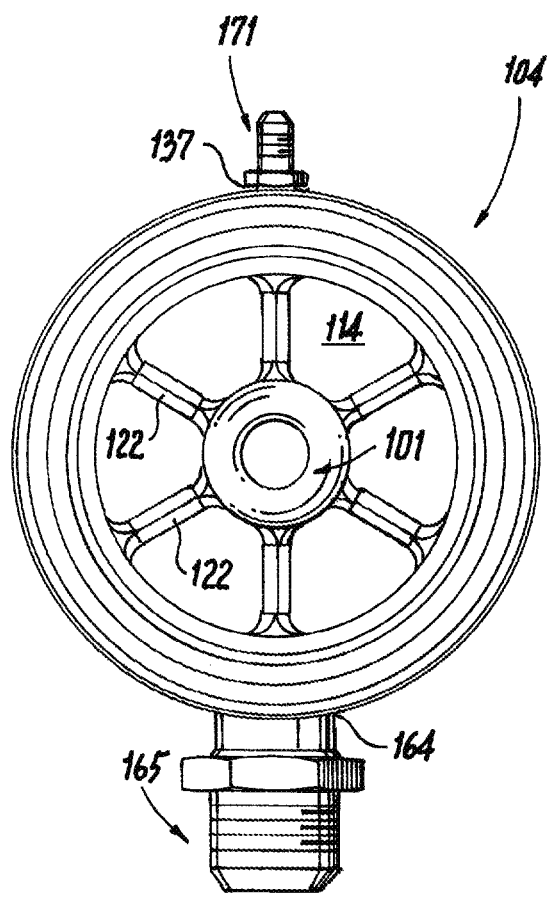
FIG. 2C is an upstream view of the injector assembly of FIG. 2A, showing first and second portions of the outer housing.

Reference will now be made to the drawings wherein like reference numerals identify similar structural features or aspects of the subject disclosure. For purposes of explanation and illustration, and not limitation, a partial view of an exemplary embodiment of a fuel inerting system in accordance with the disclosure is shown in FIG. 1 and is designated generally by reference character 100. Other embodiments of fuel inerting systems in accordance with the disclosure, or aspects thereof, are provided in FIGS. 2A-6, as will be described. The systems and methods described herein can be used to facilitate fuel injecting/mixing in fuel inerting systems to vaporize fuel under arduous flight conditions. Nozzles described herein provide the desired mixing, and production of fine spray at very low flow rates while still maintaining contamination resistance.

As shown in FIG. 1, a fuel inerting system 100 includes a duct 102 and an injector assembly 104 positioned within the duct 102. The injector assembly 104 is schematically shown in FIG. 1, with more detail shown in FIGS. 2A-2C and 3. The injector assembly 104 includes a nozzle 101, which is also schematically shown in FIG. 1. Nozzle 101 is an encapsulated, aerating fuel atomizer that uses engine bleed air to finely atomize very cold fuel flowing at very low flow rates. The inerting system 100 includes a catalytic reactor 106 positioned within the duct 102 downstream from the injector assembly 104 and at least one fuel tank 108 downstream from the catalytic reactor 106. Temperature and/or humidity control system 110 is positioned downstream from the catalytic reactor 106 and upstream from the nozzle 101. The temperature and/or humidity control system 110 includes at least one heat exchanger 110a and at least one water condenser 110b. A hot recirculation flow enters into the nozzle 101 after being heated by a heat exchanger 110a. The hot recirculation flow is mixed with a fresh air and fuel mixture (generated by nozzle 101) downstream from the nozzle 101 to generate a hot mixed/mixing fuel and gas mixture. The liquid/gas mixing by nozzle 101 is thorough but very efficient to maintain low system pressure loss. Moreover, the injection process within nozzle 101 itself is configured to cause minimal drop on the recirculating flow, as pressure is required downstream from the nozzle 101 to push flow through the reactor 106, heat exchanger 110a and water condenser 110b as well as provide flow to the fuel tank(s) 108. That hot mixed/mixing fuel and gas mixture goes into the catalytic reactor 106 and exits as mostly nitrogen, carbon dioxide and water (in the form of a low reactivity gas). The mixture entering catalytic reactor 106 contains mostly nitrogen and the catalytic reactor 106 reduces levels of oxygen that were present in the air before the reactor. The carbon dioxide and water are the remnants of the fuel. The oxygen in the air is reduced, not totally eliminated, to reduce reactivity. The mixture exiting the catalytic reactor is then de-watered by way of water condenser 110b before going to the fuel tank 108 to replace the air in the ullage of fuel tank 108.

As shown in FIGS. 2A-2C and 3, the injector assembly 104 includes an outer housing 112. The nozzle 101 is positioned within the outer housing 112. The injector assembly 104 includes an annular outer housing gas flow path 114 radially outward from the nozzle 101 between an inner surface 116 of the outer housing 112 and an outer surface 118 of the nozzle 101. Annular outer housing gas flow path 114 facilitates a low-pressure flow of gas from the upstream recirculating gas path (labeled "recirculating air in" in FIG. 3) to pass around an outer diameter of nozzle 101. The nozzle 101 defines a core conduit 134 radially inward from nozzle body. Conduit 134 defines a low pressure flow path that allows air from the upstream recirculating gas path (labeled "recirculating air in" in FIG. 3) to pass through the center of nozzle 101 in order to maximize air for mixing with the atomized fuel stream downstream of the nozzle 101, as shown schematically by central recirculating air arrow 167. In some embodiments, 50% or less of the "air in" flows through core conduit 134, depending on the size, while the remaining "air in" flows through flow path 114. The direction of flow path 114 is schematically shown by the two outer diameter arrows 167, which are labeled "recirculating air," in FIG. 3. The injector assembly 104 includes a plurality of struts 122 operatively connecting the nozzle 101 to the outer housing 112. The upstream and downstream shape of strut 122 keeps a uniform flow delivery through gas flow path 114. Struts 112 have a narrow construction to reduce drag through 114. Outer housing 112 mounts between two portions 102a and 102b of duct 102. The outer housing 112 includes a first portion 124 and a second portion 126. The first portion 124 of the outer housing 112 is connected to the upstream portion 102a of the duct 102 and the second portion 126 of the outer housing 112 is connected to the downstream portion 102b of the duct 102. This configuration allows for ease of part exchange in the field. Each housing portion 124 and 126 include respective flanges 124a and 126a that facilitate exchangeability in the field. A pressure drop in the duct 102 from a first position 160 upstream from the nozzle 101 to a second position 162 downstream from the nozzle 101 is minimal, which accommodates the pressure needs downstream in system 100.

Figure 3:
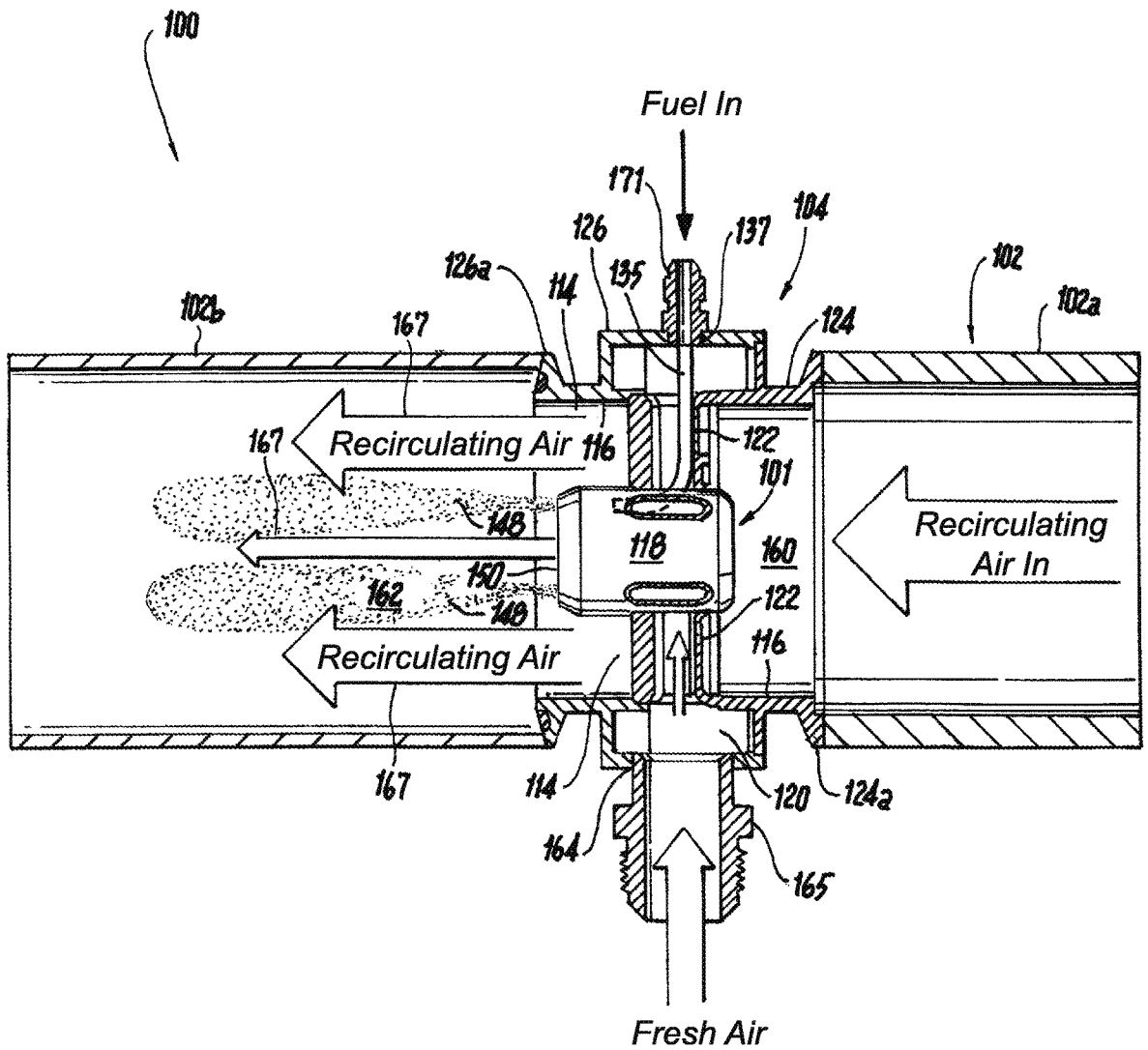
FIG. 3 is cross-sectional side elevation view of the fuel inerting system of FIG. 1, showing the injector assembly of FIG. 2A connected to a duct with the nozzle body (not in cross-section) shown in the middle of the duct, the struts extending out of the page are shown in cross-section for sake of clarity.
Figure 4A:
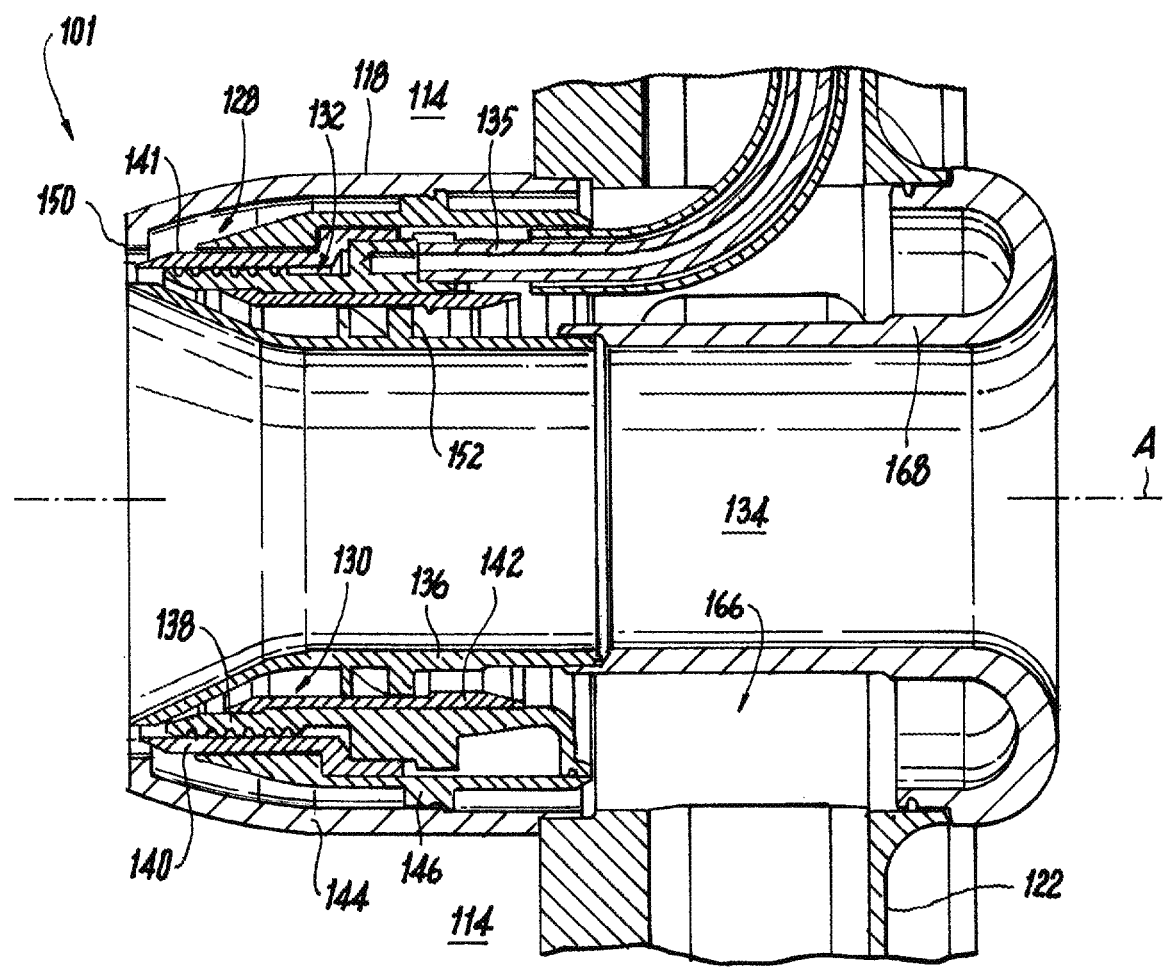
FIG. 4A is a cross-sectional side elevation view of a nozzle of the injector assembly of FIGS. 2A-2B constructed in accordance with the embodiments of the present disclosure, showing inner and outer gas flow paths.
Figure 4B:
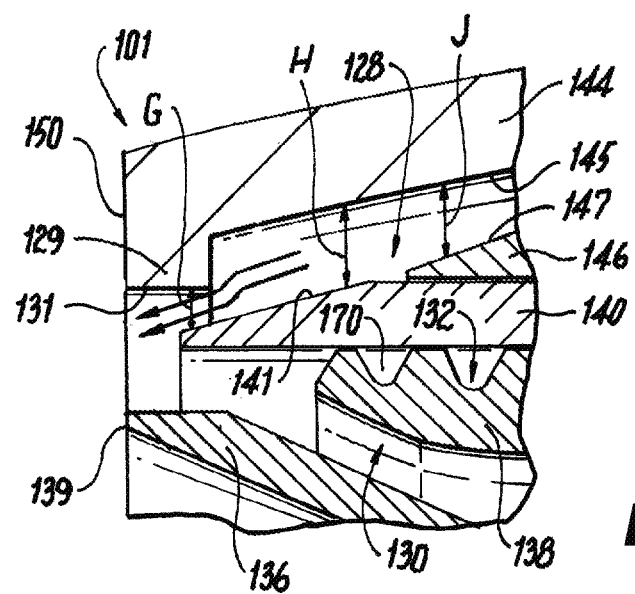
FIG. 4B is an enlarged cross-sectional side elevation view of a portion of the nozzle of FIG. 4A, showing a metering flow lip of the gas flow path.

As shown in FIGS. 3-4B, the nozzle 101 includes an annular pressurized outer gas flow path 128 and an annular pressurized inner gas flow path 130 radially inward from the outer gas flow path 128. The outer gas flow path 128 has a metering flow lip 129 at an outlet thereof. Metering flow lip 129 is an annular flow lip 129. Metering flow lip 129 maximizes flow velocity through outer gas flow path 128 while still maintaining the desired annular gap margins for contamination resistance, described in more detail below. The nozzle 101 includes an annular liquid flow path 132 defined radially between the inner gas flow path 130 and the outer air flow path 128. The inner gas flow path 130 is defined between an annular inner heat shield 142 and an annular core nozzle shell 136. Liquid flow path 132 is a liquid fuel flow path that is in fluid communication with a fluid conduit 135. Fluid conduit 135 extends out of nozzle 101 through one of struts 122 and connects to a fluid inlet 137 defined through second portion 126 of housing 112. Fluid inlet 137 includes a fitting or other conduit 171 attached thereto to provide fuel (or other fluid) to fuel inlet 137. The core conduit 134 is coaxial with the outer gas flow path 128, the inner gas flow path 130 and the outer housing gas flow path 114 about nozzle longitudinal axis A.

As shown in FIGS. 4A-4B, the outer gas flow path 128 is defined between an annular outer nozzle shell 144 and at least one of an annular outer heat shield 146 or an annular outer diameter liquid distributor 140. The outer surface 118 of the nozzle 101 is also an outer surface of outer nozzle shell 144, meaning that the outer housing gas flow path 114 is radially outward from the outer nozzle shell 144. The outer gas flow path 128 is a converging non-swirling gas flow path. The outer nozzle shell 144 is radially outward from the outer heat shield 146. The metering flow lip 129 is defined by a radially inward extending flange 129 of the outer nozzle shell 144. Flange 129 extends inwardly and perpendicular to the nozzle longitudinal axis A. An annular opening G defined in a radial direction between an edge surface 131 of metering flow lip 129 and an outer diameter surface 141 of the outer diameter liquid distributor 140 is smaller than an upstream annular opening H defined in a radial direction between an inner diameter surface 145 of the outer nozzle shell 144 and the outer diameter surface 141 of the outer diameter liquid distributor 140. The annular opening G is smaller than an upstream annular opening J defined in a radial direction between the inner diameter surface 145 of the outer nozzle shell 144 and an outer diameter surface 147 of the outer heat shield 146.

With continued reference to FIG. 4B, annular opening G is sized to be at or above a minimum annular gap threshold to ensure durability and contamination resistance. For example, sand ingested by the engine can find its way into the air stream utilized in manifold 120, described below. Generally, small annular gaps for outer gas flow path 128 and inner gas flow path 130 are desired in order to meter the air flow through the nozzle 101 at a desired pressure. To avoid contamination issues, the downstream gas flow paths 128 and 130 must be a minimum size to accommodate for this contamination. In some embodiments, however, due to the large overall diameter of nozzle 101, e.g. approximately 0.5 inches to 5 inches in diameter, the minimum annular gap required for contamination may not be small enough to meet the desired pressure. As such, the metering flow lip 129, e.g. a flange, is used to accelerate air through the outer gas flow path 128 without reducing the size of the annular opening G below the minimum threshold. The use of an inwardly extending flange 129 to form the lip creates a "hook" like downstream end that deflects and thereby accelerates the flow through outer gas flow path 128 (this deflection is shown schematically by the flow arrows through flow path 128 in FIG. 4B). This flow acceleration imposes an increase in pressure drop and reduces the effective gap height. The flow is thereby more energetic for mixing with a liquid from liquid flow path 132 and liquid atomization but still meets the contamination resistance criteria. In some embodiments, the minimum threshold for annular opening G is approximately 0.020 inches wide (in the radial direction). In the present embodiments shown in the drawings, outer nozzle shell 144 and the core nozzle shell 136 terminate at respective downstream ends 150 and 139 at the same axial position relative to a longitudinal nozzle axis A. Those skilled in the art, however, will readily appreciate that, in some embodiments, a downstream end 150 of outer nozzle shell 144 can terminate at an upstream or downstream axial position relative to the downstream end 139 of the core nozzle shell 136.

With continued reference to FIGS. 3-4B, the injector assembly 104 includes a gas manifold, e.g. a fresh air manifold 120. The fresh air is fed into the nozzle 101 from a fresh air inlet 164 defined through second portion 126 of housing 112 into manifold 120. Fresh air inlet 164 is supplied via a conduit 165. Fresh air supply to conduit 165 could be bleed air from an aircraft engine which may be laden with particulate matter (i.e. sand) from the aircraft environment. In view of this, nozzle 101 is configured and adapted to withstand this particulate matter, for example by using a minimum gap threshold as described above. Manifold 120 then distributes the fresh air through the struts 122 struts to an annular air distributor 166 of nozzle 101. The annular air distributor 166 is in fluid communication with the inner gas flow path 130 and the outer gas flow path 128 of the nozzle 101. The pressure drop from inlet 164 to outlets of gas flow paths 128 and 130 of nozzle 101 is relatively low, e.g. ranging from 1.5 to 10 psi, such as 3 psi. Liquid fuel from liquid flow path 132 is thoroughly premixed with the fresh air supply from inner and outer gas flow paths 130 and 128, respectively. In accordance with some embodiments, nozzle 101 is configured and adapted to mix 0.5 to 5 pounds per hour (pph), e.g. 3 pph, or more, jet fuel between −40 to 250° F., using large flow area contamination resistant annular flow channels, (e.g. having a width in a radial direction of 0.020 inches), with high pressure engine bleed air (e.g. "fresh air" at about 50 psia, and 400° F.) at about a 40:1 air to fuel by mass ratio (for the nozzle itself). It is contemplated that in some embodiments, nozzle 101 can mix fuel that is lower than −40° F. Flow kinetic energy from fuel nozzle 101 facilitates good atomization of the fuel, for example, to achieve an air-to-fuel mass ratio of 40:1. It is also contemplated that the flow rate through nozzle and/or the mixing ration can vary as determined by the requirements for the downstream catalytic converter 106. In traditional mixing devices, a low fuel flow rate his would usually require a very small pressure atomizing nozzle spray at a high fuel pressure, however these are susceptible to contamination when immersed in a hot air environment.

With continued reference to FIGS. 3-4B, the spray issued from nozzle 101 is then thoroughly mixed with the recirculating air downstream from nozzle 101, preferably without any supplementary mixing devices which would rob the system 100 of pressure required to circulate the mixture through the reactor 106 and temperature and/or humidity control system 110. This further dilutes the previously reacted mixture (e.g. the air schematically shown as "Air In" in FIG. 3, which is the recirculating vitiated dilution gas that goes into core conduit 134 and outer gas flow path 114) before entering the catalytic reactor 106. The recirculating vitiated dilution gas is, for example, approximately at a pressure of 47 psia and 400° F. This is mixed with the fuel/fresh air mixture from nozzle 101 at a ratio of about 10:1 recirculating vitiated dilution gas to fresh air and fuel flow, for an overall air (vitiated and fresh) to fuel ratio which could exceed 400:1.

With continued reference to FIGS. 3-4B, the core conduit 134 is defined along an interior of the annular core nozzle shell 136 and an annular upstream inner core housing 168. The core conduit 134 and the outer housing gas flow path 114 are in fluid communication with a first gas source, e.g. a recirculating vitiated air source from upstream portion 102a of duct 102. A pressure drop across at least one of the core conduit 134 or the outer housing gas flow path 114 from a first position 160 upstream from the nozzle 101 to a second position 162 downstream from the nozzle 101 is minimal, e.g. approximately a few inches of water pressure differential. The inner gas flow path 130 and the outer gas flow path 128 are in fluid communication with a second gas source (e.g. a pressurized fresh air source, such as engine bleed air) through annular air distributor 166 as described above, which is different from the first gas source. In accordance with certain embodiments, the first gas source is at a lower pressure than the second gas source.

Figure 6:
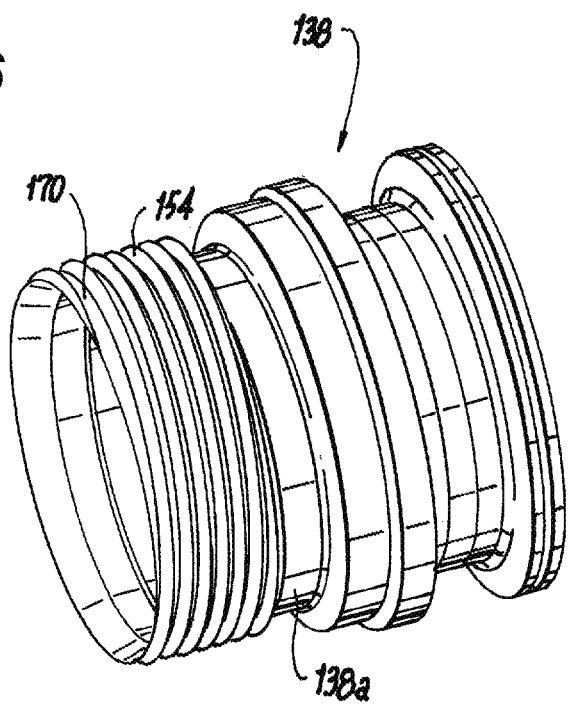
FIG. 6 is a perspective view of the inner diameter liquid distributor of the nozzle of FIG. 4A, showing the distribution channels between the helical threads.

As shown in FIGS. 4A-4B and 6, the liquid flow path 132 is defined between an annular inner diameter liquid distributor 138 and the annular outer diameter liquid distributor 140. The inner diameter liquid distributor 138 includes helical threads 154, for example, three helical threads 154. Helical threads 154 are defined on an outer cylindrical surface 138a of the inner diameter liquid distributor 138 and form multiple high-swirl angle channels 170 as part of liquid flow path 132. Those skilled in the art will readily appreciate that the threads 154 can readily be defined on an inner cylindrical surface of the outer diameter liquid distributor 140. Multiple high swirl angle channels 170 help distribute fuel to a large diameter annulus, e.g. approximately 0.5 inches to 5 inches in diameter. Channels 170 are large in flow area to avoid contamination, for example, depending on the shape, they can be approximately 0.020 inches wide (in a radial direction).

Figure 5:
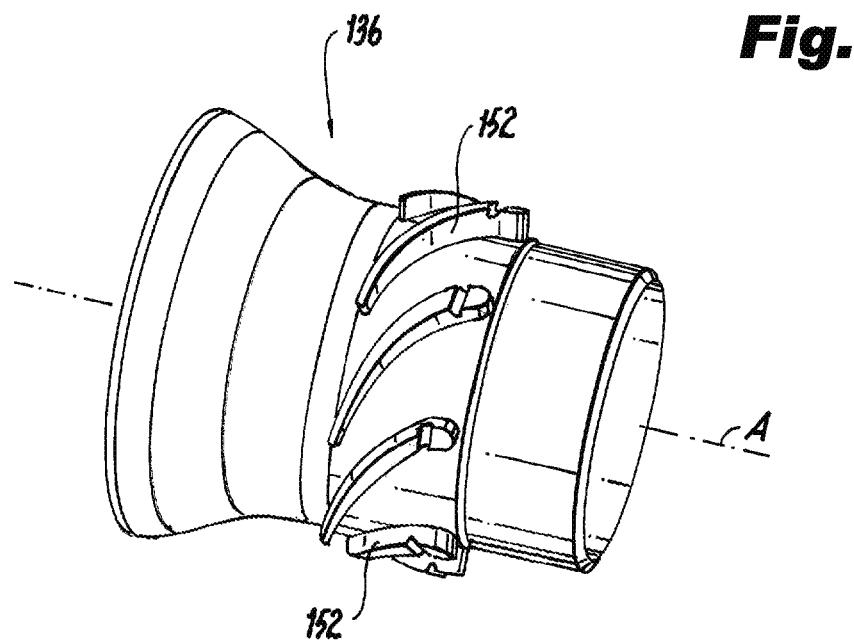
FIG. 5 is a perspective view of the core nozzle shell of the nozzle of FIG. 4A, showing the swirl vanes of the core nozzle shell.

As shown in FIGS. 4A-4B and 5, the inner gas flow path 130 is a diverging swirling gas flow path. The core nozzle shell 136 includes swirl vanes 152 extending therefrom. Swirl vanes 152 can be at approximately 60 degrees or greater with respect to an upstream direction of inner gas flow path 130 (which is approximately parallel to the direction of longitudinal axis A). Mixing and atomization processes require energy in the form of kinetic energy to impart shearing action on the flow to produce mixing and stretching of fuel film to produce drops. The high angle air swirler (defined by the inner heat shield 142 and the core nozzle shell 136) is used to pressurize air through inner gas flow path 130, and energize (kinetically) the fuel atomizer and the downstream mixer. The high angle air swirler helps to thin out and circumferentially distribute the fuel film coming from the liquid fuel path 132. Those skilled in the art will readily appreciate that, in some embodiments, the swirl vanes 152 can extend from the inner heat shield 142.

As shown in FIG. 3, a mixing zone where spray 148, schematically depicted (in part) with stippling in FIG. 3, and recirculating air 167 mix together is defined downstream from an outlet 150 of the nozzle 101 can, in some embodiments, have an air-to-liquid ratio of 400 to 1. The spray 148 is generally made up of fine droplets to facilitate evaporation fast enough before the catalytic reactor 106. The uniform vapor permits optimal catalytic reactor performance and durability. For example, the droplet size in the spray leaving nozzle 101 can be in the order of twenty microns or less. The final gas mixture (e.g. the spray combined with the recirculating air) may be up to 400:1 gas to fuel by mass such that the temperature of the resulting gas be kept sufficiently low to be below the auto ignition temperature of jet fuel (approx. 400° F.), to thereby avoid inadvertently igniting any fuel/air mixture in the mixing process. Moreover, system 100 provides for an injection process where the spray issued from nozzle 101 is narrow such that spray is kept off any conduits in system 100.

The methods and systems of the present disclosure, as described above and shown in the drawings, provide for fuel inerting systems and injector assemblies with superior properties including improved mixing with low pressure loss. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A nozzle comprising:
an outer gas flow path having a metering flow lip at an outlet thereof, wherein the outer gas flow path is defined between an outer nozzle shell and an outer diameter liquid distributor, wherein the metering flow lip is defined by a radially inward extending flange of the outer nozzle shell;
an annular opening defined in a radial direction between an edge surface of the radially inward extending flange of the outer nozzle shell and an outer diameter of the outer diameter liquid distributor, wherein at least a portion of the radially inward extending flange and at least a portion of the outer diameter liquid distributor are at same axial position relative to a longitudinal nozzle axis A;
an inner gas flow path radially inward from the outer gas flow path;
a liquid flow path defined radially between the inner gas flow path and the outer gas flow path; and
a core conduit defined radially inward from the inner gas flow path.

2. The nozzle as recited in claim 1, wherein a portion of the outer gas flow path is defined between the outer nozzle shell and an outer heat shield.

3. The nozzle as recited in claim 2, wherein the outer nozzle shell is radially outward from the outer heat shield.

4. The nozzle as recited in claim 1, wherein the annular opening is smaller than an upstream annular opening defined between an inner diameter surface of the outer nozzle shell and the outer diameter surface of the outer diameter liquid distributor.

5. The nozzle as recited in claim 2, wherein the annular opening is smaller than an upstream annular opening defined between an inner diameter surface of the outer nozzle shell and an outer diameter surface of the outer heat shield.

6. The nozzle as recited in claim 1, further comprising an outer housing gas flow path defined radially outward from the outer nozzle shell.

7. The nozzle as recited in claim 1, wherein the core conduit is defined within a core nozzle shell.

8. The nozzle as recited in claim 7, wherein the outer gas flow path is defined between an outer nozzle shell and at least one of an outer heat shield or an outer diameter liquid distributor, wherein the outer nozzle shell and the core nozzle shell terminate at respective downstream ends at the same axial position relative to a longitudinal nozzle axis.

9. An injector assembly comprising:
an outer housing;
a nozzle positioned within the outer housing, the nozzle including:
an outer gas flow path having a metering flow lip at an outlet thereof; wherein the outer gas flow path is defined between an outer nozzle shell and an outer diameter liquid distributor, wherein the metering flow lip is defined by a radially inward extending flange of the outer nozzle shell;
an annular opening defined in a radial direction between an edge surface of the radially inward extending flange of the outer nozzle shell and an outer diameter of the outer diameter liquid distributor, wherein at least a portion of the radially inward extending flange and at least a portion of the outer diameter liquid distributor are at same axial position relative to a longitudinal nozzle axis A;
an inner gas flow path radially inward from the outer gas flow path;
a liquid flow path defined radially between the inner gas flow path and the outer gas flow path; and
a core conduit defined radially inward from the inner gas flow path; and
an outer housing gas flow path defined radially outward from the nozzle between an inner surface of the outer housing and an outer surface of the nozzle.

10. The injector assembly as recited in claim 9, wherein a portion of the outer gas flow path is defined between the outer nozzle shell and an outer heat shield.

11. The injector assembly as recited in claim 10, wherein the annular opening is smaller than an upstream annular opening defined between an inner diameter surface of the outer nozzle shell and the outer diameter surface of the outer diameter liquid distributor.

12. The injector assembly as recited in claim 10, wherein the annular opening is smaller than an upstream annular opening defined between an inner diameter surface of the outer nozzle shell and an outer diameter surface of the outer heat shield.

13. The injector assembly as recited in claim 9, wherein the core conduit is defined within a core nozzle shell.

14. The injector assembly as recited in claim 13, wherein the outer gas flow path is defined between an outer nozzle shell and at least one of an outer heat shield or an outer diameter liquid distributor, wherein the outer nozzle shell and the core nozzle shell terminate at respective downstream ends at the same axial position relative to a longitudinal nozzle axis.

15. The injector assembly as recited in claim 9, further comprising a gas manifold in fluid communication with at least one of the inner gas flow path or the outer gas flow path of the nozzle.

16. An inerting system comprising:
a duct;
an injector assembly positioned within the duct, wherein the injector assembly includes a nozzle, the nozzle including:
an outer gas flow path having a metering flow lip at an outlet thereof;
an inner gas flow path radially inward from the outer gas flow path;
a liquid flow path defined radially between the inner gas flow path and the outer gas flow path; and
a core conduit defined radially inward from the inner gas flow path; and
a catalytic reactor positioned within the duct downstream from the injector assembly; and
at least one tank downstream from the catalytic reactor.

17. The inerting system as recited in claim 16, wherein a pressure drop in the duct from a first position upstream from the nozzle to a second position downstream from the nozzle is configured and adapted to be three inches of water pressure or less.

18. The inerting system as recited in claim 16, wherein the duct includes an upstream portion and a downstream portion, wherein the injector assembly includes an outer housing with a first portion and a second portion, wherein the first portion of the outer housing is connected to the upstream portion of the duct and the second portion of the outer housing is connected to the downstream portion of the duct.

* * * * *